Feb. 13, 1934.         G. G. MIZE         1,947,421
CONNECTING LINK FOR CHAINS
Filed Aug. 1, 1928
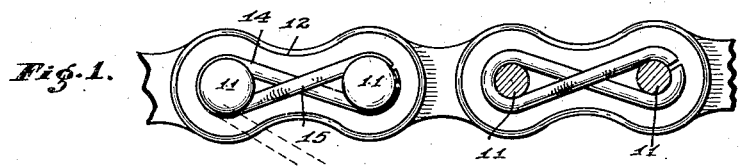
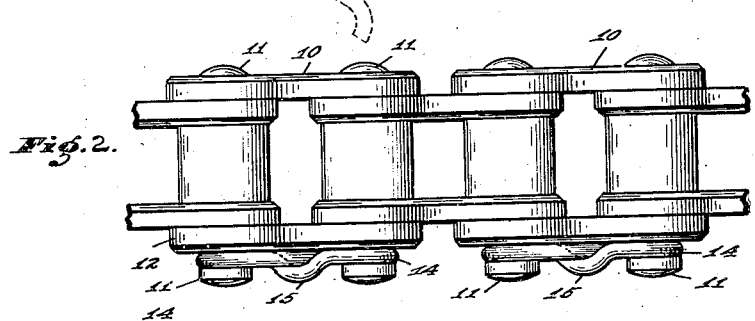
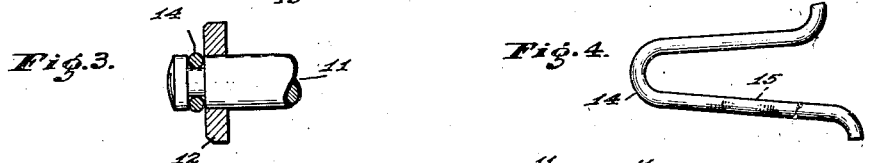
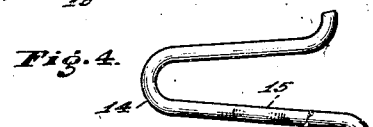
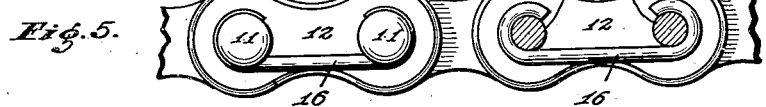
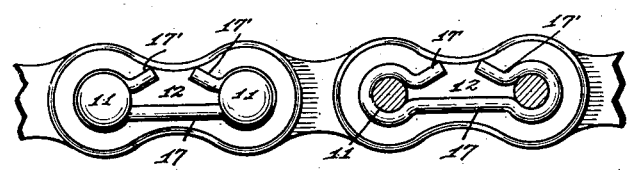
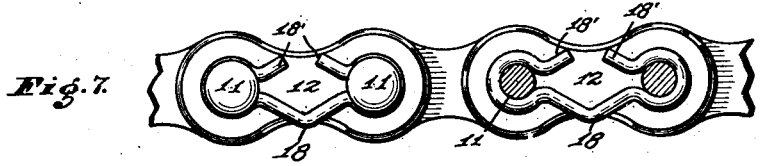
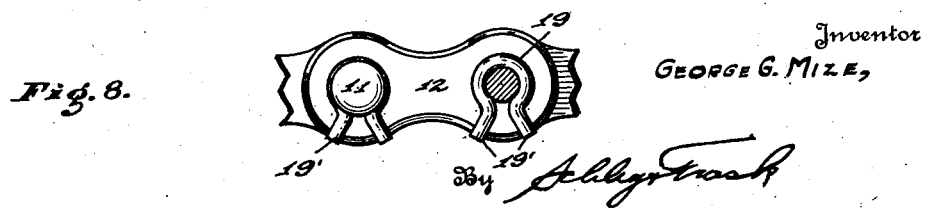
Inventor
GEORGE G. MIZE,
By
Attorneys Patented Feb. 13, 1934

1,947,421

UNITED STATES PATENT OFFICE 1,947,421

CONNECTING LINK FOR CHAINS

George G. Mize, Indianapolis, Ind., assignor to Diamond Chain and Manufacturing Company, Indianapolis, Ind., a corporation of Indiana Application August 1, 1928. Serial No. 296,810

4 Claims. (Cl. 74—254)

In connecting together the ends of chain of the block or roller type, and sometimes in connecting a series of blocks to form a complete chain, it is customary to employ a connecting link comprising a pair of pins mounted in a chain side-bar and adapted to be passed through the openings in the bushings or blocks which are to be connected. After these pins are inserted in such holes, a chain side-bar is placed over the ends of the pins and is held in place by some suitable means, usually a clip of sheet metal which engages grooves in the ends of the pins and prevents removal of the side-bars, although cotter pins passing through holes in the ends of the pins are also employed, particularly in larger sizes of chain. These prior methods of holding the removable side-bar of the connecting link in place have proven objectionable largely because the side-bar retaining means is loose when in place and is subject to vibration and breakage, particularly when the chain is run at a high speed.

It is the object of my invention to produce a connecting link embodying a novel type of clip for holding the removable side-bar in place. More specifically, it is my object to provide the connecting link with a clip which will not become accidently detached but which can easily be removed when it is desirable to disengage the chain-ends, and which will not be loose on the connecting link and will therefore not be subject to vibration and breakage. A further object of my invention is to produce a clip which can be easily and economically manufactured.

The accompanying drawing illustrates my invention: Fig. 1 is an elevation of a section of chain embodying two of my novel connecting links; Fig. 2 is a plan view of the chain section illustrated in Fig. 1; Fig. 3 is a transverse section through one of the pins of the connecting link; Fig. 4 is an elevation of the clip illustrated in Figs. 1 and 2 showing its normal shape when not in use; and Figs. 5 to 8 inclusive are elevations similar to Fig. 1 but illustrating modified forms of clips.

My connecting link embodies a side-bar 10 in the ends of which are mounted two pins 11 adapted to pass through holes in the chain-ends or adjacent blocks which are to be connected together by the connecting link. In addition to the side-bar 10 and the two pins 11, the complete connecting link comprises a second side-bar 12 having holes adapted to receive the projecting ends of the pins 11. When the connecting link is employed to secure together the ends of a chain, the side-bar 12 usually has a loose or slip fit on the ends of the pins 11; but when the whole chain is built up of blocks each of which is attached to the next by a connecting link of the type with which my invention is concerned, the side-bar 12 commonly has a press fit on the ends of the pins 11. Adjacent the outer face of the removable side-bar 12, the pins 11 are provided with grooves adapted to receive a clip which holds the side-bar 12 in place and prevents removal of the connecting link.

The clips which I employ may be of various shapes, some of which are illustrated in the drawing and all of which have certain features in common.

The clip 14 illustrated in Figs. 1 to 4 inclusive is formed of spring wire and when not in place on a connecting link normally has the general U-shape shown in Fig. 4. The two legs of the clip are of unequal length, and the extreme ends thereof are bent outwardly. The longer leg may be provided with an offset portion 15 which enables the two legs to be crossed when the clip is in place.

In applying the clip 14 to the chain it is first brought into engagement with the projecting ends of the pins 11 in the position shown in dotted lines in Fig. 1 with the intermediate bend of the clip lying in the annular groove of one of the pins 11 and with one of the out-bent ends of the other leg lying in the groove of the other pin. The long leg of the clip is then brought upward across the short leg, and its out-bent end is forced into the groove. To remove the clip, a reverse series of operations is performed.

The grooves in the ends of the pins 11 are made somewhat deeper than the radius of the wire of which the clip 14 is formed, as is clear from Fig. 3. By doing this, I am able to bend those portions of the clip which lie in grooves in the pins 11 in such a manner that the radius of the center line of the material of the clip is less than the diameter of the pin 11. As a result, any tendency of the side-bar 12 to move outward causes the wire of which the clip 14 is formed to be cammed inwardly—or to be more firmly seated in its groove within the pin 11.

The clip illustrated in Fig. 5 is formed with a straight intermediate portion and two arcuate end portions, each of the end portions being more than 180° in extent. When the clip 16 is in place, the arcuate end portions lie in the grooves of the pins 11 and prevent removal of the side-bar 12.

The clip 17 illustrated in Fig. 6 is somewhat similar to the clip 16 in that it has a straight intermediate portion. The ends of the clip 17, however, are formed into loops adapted to lie in the grooves of the pins 11. The extreme ends of the wire of which the clip 17 is formed may be bent outwardly as at 17' to facilitate removal of the clip.

The clip 18 illustrated in Fig. 7 is similar to the clip 17 except that its intermediate portion is V-shaped instead of being straight. This shape gives to the clip a degree of longitudinal elasticity which facilitates its application and removal.

In all the clips so far described, a single clip is employed to engage both pins 11 of the connecting link. This is not necessary, however, as I have illustrated in Fig. 8 a construction in which each of the pins 11 is provided with its own clip 19. Each of the clips 19 is in the form of a loop adapted to encircle partially the grooved portion of its associated pin 11. The ends 19' of the loop may be bent outwardly as are the ends 17' of the loop 17 to facilitate application and removal of the clip.

It will be noted that each of the clips illustrated and described is formed of a piece of spring wire. Although each clip illustrated is shown as formed of round wire, this is not in any way essential, particularly in the larger sizes. Those portions of the clips which surround the pins 11 are all more than 180° in extent, so that they cannot readily be disengaged. Further, the wire of which each clip is formed has in cross-section a radius less than the depth of the groove in each of the pins 11 in order that any tendency of the side-bar to move outwardly will seat the clip more firmly in such groove.

I prefer to form the clip in such a manner that it is stressed when in place in the grooves of the connecting link pins in order that it may bear against such pins at all times. By doing this, I eliminate the possibility of vibration which has caused breakage in all types of connecting links.

The clip may be used on connecting links for multiple chains as well as for the single chain illustrated.

I claim as my invention:

1. A retaining clip for retaining in place the removable side-bar of a chain connecting link, comprising a single piece of wire which when unstressed is of a general U-shape one leg of which is longer than the other, the two legs being provided with out-turned ends and one leg being provided with an offset portion to permit the two legs of the clip to be crossed when in place on the connecting link.

2. A retaining clip for retaining in place the removable side-bar of a chain connecting link, comprising a single piece of wire which when unstressed is of a general U-shape, the two legs being provided with out-turned ends and one leg being provided with an offset portion to permit the two legs of the clip to be crossed when in place on the connecting link.

3. A retaining clip for chain connecting link having two pins provided with annular grooves, said clip comprising a single piece of wire which when unstressed is of a general U-shape the bend of which is adapted to lie in the annular groove of one link pin, and the two ends of the clip being bent outwardly to provide portions adapted to lie in the groove of the other link pin when the two legs of the U-shaped clip are crossed.

4. A retaining clip for retaining in place the removable side-bar of a chain connecting link, comprising a single piece of spring wire which, when in place on the connecting link, is of a general 8-shape, the ends of the wire of which the clip is formed being in proximity to each other in one looped end of the clip.

GEORGE G. MIZE.